2,764,502

Patented Sept. 25, 1956

2,764,502

METHOD OF TREATING RESINOUS MATERIALS TO IMPROVE THEIR ADHESION CHARACTERISTICS

Cherry L. Emerson, Jr., Duxbury, Mass., assignor to Emerson & Cuming, Inc., Canton, Mass., a corporation of Massachusetts No Drawing. Application November 26, 1954, Serial No. 471,515

8 Claims. (Cl. 117—47)

The present invention relates to the cementing of organic plastic materials and has as an object to increase the adhesion of cements to plastic materials.

Cementing techniques in the fabrication of articles of plastics have only limited utility because the nature of many plastics is such that an adequately strong cement bond cannot be made. Thus, many plastics having desired properties for a particular application cannot be readily used to maximum advantage.

The present invention overcomes these difficulties and now makes it possible to form adhesive bonds of remarkable strength with many plastic materials which heretofore could not be so bonded. For instance, the plastic condensation product of terephthalic acid and ethylene glycol commercially available under the trade name "Mylar" in film form has ideal properties as a packaging material but has failed of extensive use in this field because of the lack of a satisfactory bonding technique. This invention, however, will produce an adhesive bond to Mylar stronger than its tensile strength, yet without in any way degrading the plastic. Similar improved results are also attained with nylon, and with polyester resins such as the condensation product of ethylene glycol and maleic anhydride, and other reaction products of polybasic acids and polyhydroxy alcohols.

Another important field of use of this invention is in the fabrication of panels for printed circuits in electronics work, in which a metal foil is cemented to a plastic sheet. The invention is also useful in metal coating plastic materials to improve the bond between the plastic and the metal, such as silver or copper deposited from an ammoniacal solution of its ammonia complex by reduction with an aldehyde.

Improved bonds according to this invention are formed by surface treating the plastic with a strong hot alkaline solution for a few minutes and then rinsing off excess solution and drying. It has been found that after such a treatment, a cement adheres to the plastic with greatly increased strength.

Thus, in a typical procedure, the plastic material, for instance Mylar, is dipped in a solution of sodium hydroxide having a concentration of about 20–25% by weight and a temperature of about 160–215° F., for from about 2 to 10 minutes, and is then removed, washed in water, alcohol, acetone or the like, to remove adsorbed alkali, and dried.

A cement, for instance an epoxide resin cement such as the liquid partial condensation product of epichlorohydrin and bisphenol, may now be applied to the treated plastic, either in bonding the plastic to itself, as in packaging application, or in bonding the plastic to other materials, and a strong bond will be formed.

Although the treatment described in the preceding paragraphs is suitable for many applications, far superior results are attained if the alkali treatment is followed by brief contacting of the plastic surface with a dilute solution of a lead or tin salt. In this subsequent step, the lead or tin salt need not be present in a concentration exceeding 5% by weight, and lower concentrations, e. g. from 0.5–1.0, or even lower, are frequently entirely satisfactory. The temperature of the lead or tin salt solution may range anywhere between the freezing point and boling point, and appears not to be particularly critical, and a contact time of a few seconds is satisfactory although longer times are not detrimental. After the immersion the plastic surface is washed thoroughly and dried and the cement applied in the usual manner.

Typical examples of preferred embodiments of this invention, selected for purposes of illustration, are given below.

*Example I*

In preparing a Mylar film for use in packaging with cemented seams, the film is immersed in an aqueous solution containing 20% by weight of NaOH heated to 180° F. for 5 minutes and is then rinsed thoroughly in water. The film is next dipped in a dilute room temperature (20° C.) solution of stannous chloride, formed by dissolving 10 grams of C. P. $SnCl_2$ in 1 liter of distilled water, for about 5 seconds, and then rinsed with water and dried.

A wrapping formed of the film and cemented at the seams with an epoxide resin cement will form a bond stronger than the Mylar, that is, having a tensile strength in excess of 18,000 p. s. i., whereas, the untreated plastic will develop a bond of maximum tensile strength of about 1,000 p. s. i.

Other suitable cements which are generally satisfactory include those formed of polyester resin condensation products, glyptal resin cements, phenolic resin cements and similar well known cements.

*Example II*

In forming a printed circuit panel of copper foil cemented on a nylon sheet, the nylon sheet is advantageously treated by the procedure described in Example 1, and then spread with a layer of epoxide resin cement, and the copper foil applied and pressed into close contact during hardening of the cement. The foil cannot be pulled off without splitting the plastic sheet.

Another advantageous use of this invention is in the manufacture of coils for high frequency electronic devices. Plastic materials are frequently used to wind the coils, which are then impregnated with a liquid resin. Frequently, the resin fails to bond with the plastic, and there results a corona discharge. It is contemplated that treatment of the plastic in accordance with this invention will so improve the adhesion as to eliminate the corona effect.

The foregoing description of typical embodiments of this invention has been presented by way of example and it is contemplated that modifications readily occurring to those skilled in the art may be made without departing from the scope of the invention. For instance, in the initial alkaline treatment, a wide variety of alkaline materials may be used, for instance, sodium hydroxide, potassium hydroxide, ammonia and others, and the conditions of concentration, time and temperature, may also be varied in accordance with well-known principles of chemical kinetics.

Similarly, in the second treatment other tin or lead salts may be used and the conditions of time, temperature and concentration may be varied widely.

Having thus disclosed this invention and described in detail preferred embodiments thereof, I claim and desire to secure by Letters Patent:

1. In a method of cementing plastics selected from the group consisting of polyamide resins and polyester condensation products of polybasic acids and polyhydroxy alcohols, the steps of contacting the surface to be cemented with an aqueous alkaline solution, rinsing the surface to remove adhering alkaline solution, contacting the surface with an aqueous solution of a salt of a metal selected from the group consisting of tin and lead, rinsing and drying the surface and applying a cement to it.

2. The process defined by claim 1 wherein the plastic is the condensation product of terephthalic acid and ethylene glycol.

3. The process defined by claim 1 wherein the plastic is nylon.

4. The process defined by claim 1 wherein the cement is a condensation product of epichlorohydrin and bisphenol.

5. The method of surface treating plastic materials to improve their adhesion characteristics comprising contacting the surface of a plastic selected from the group consisting of polyamide resins and polyester condensation products of polybasic acids and polyhydroxy alcohols with an aqueous alkaline solution, rinsing the surface to remove the alkaline solution, contacting the surface with an aqueous solution of a salt of a metal selected from the group consisting of lead and tin, and rinsing the surface.

6. The method defined by claim 4 wherein the plastic is a condensation product of terephthalic acid and ethylene glycol.

7. The method defined by claim 4 wherein the plastic is nylon.

8. The product resulting from treating a plastic by the process defined by claim 4.

References Cited in the file of this patent
UNITED STATES PATENTS

| | | |
|---|---|---|
| 2,278,722 | Loiseleur | Apr. 7, 1942 |
| 2,312,296 | Hempel | Feb. 23, 1943 |
| 2,341,885 | Sowa | Feb. 15, 1944 |
| 2,602,757 | Kantrowitz | July 8, 1952 |